(12) United States Patent
Kruglick

(10) Patent No.: US 8,990,788 B2
(45) Date of Patent: Mar. 24, 2015

(54) COMPILATION OF CODE IN A DATA CENTER

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 25 days.

(21) Appl. No.: 13/521,578

(22) PCT Filed: Mar. 9, 2012

(86) PCT No.: PCT/US2012/028420
§ 371 (c)(1),
(2), (4) Date: Jul. 11, 2012

(87) PCT Pub. No.: WO2013/133846
PCT Pub. Date: Sep. 12, 2013

(65) Prior Publication Data
US 2013/0239099 A1 Sep. 12, 2013

(51) Int. Cl.
*G06F 9/45* (2006.01)
*G06F 9/44* (2006.01)
*G06F 9/455* (2006.01)

(52) U.S. Cl.
CPC ............... *G06F 8/47* (2013.01); *G06F 9/4426* (2013.01); *G06F 9/45533* (2013.01); *Y02B 60/146* (2013.01)
USPC ....................................................... 717/140

(58) Field of Classification Search
CPC .................................. G06F 8/447; G06F 8/41
See application file for complete search history.

(56) References Cited

U.S. PATENT DOCUMENTS

| | | | |
|---|---|---|---|
| 5,603,027 A * | 2/1997 | Ohkami | 717/170 |
| 2007/0277021 A1 | 11/2007 | O'Connor et al. | |
| 2010/0174770 A1 | 7/2010 | Pandya | |
| 2011/0082984 A1 | 4/2011 | Yuan | |
| 2011/0154305 A1 * | 6/2011 | LeRoux et al. | 717/140 |

FOREIGN PATENT DOCUMENTS

WO WO2011121353 A2 10/2011

OTHER PUBLICATIONS

OpenSTA, "Get Command", Jan. 2010, OpenSTA.*
Kansal, A. et al., Virtual machine power metering and provisioning, Proceedings of the 1st ACM symposium on Cloud computing, 2010, 39-50.

(Continued)

*Primary Examiner* — Lewis A Bullock, Jr.
*Assistant Examiner* — Wynuel Aquino
(74) *Attorney, Agent, or Firm* — Moritt Hock & Hamroff LLP; Steven S. Rubin, Esq.

(57) ABSTRACT

Technologies are generally described for a system, method and data center effective to execute a code. In an example, a method may include receiving, by a first processor, a first code from a second processor. The method may further include compiling the first code for first and second hardware stacks to produce first and second executable codes. The second hardware stack may be different from the first hardware stack. The method may include generating a reference to the first executable code and the second executable code and storing the reference. The method may further include receiving, by a third processor, an instance and a request to execute the instance. The method may further include executing the first executable code by the first hardware stack.

19 Claims, 5 Drawing Sheets

(56) References Cited

OTHER PUBLICATIONS

Chun, B. et al., An energy case for hybrid datacenters, ACM SIGOPS Operating Systems Review 44, 2010, 76-80.
Amazon Web Services, http://aws.amazon.com/ec2/instance-types/, retrieved on Jun. 26, 2012, 4 pages.
Jackson, J., Microsoft previews compiler-as-a-service software, www.infoworld.com/print/173207, 2011, 2 pages.
International Search Report for application with application No. PCT/US12/28420, dated May 30, 2012, 15 pages.

* cited by examiner ically described. The data center may include a first hardware stack and a second hardware stack different from the first hardware stack. The data center may include a first processor configured to communicate with the first and second hardware stack. The first processor may be effective to receive a first code, from a second processor. The first processor may be effective to compile the first code for the first hardware stack to produce a first executable code. The first processor may be effective to compile the first code for the second hardware stack to produce a second executable code, and generate a reference to the first executable code and the second executable code. The first processor may be effective to cause the reference to be stored. The data center may include a third processor configured to communicate with the first and the second hardware stack. The third processor may be effective to receive an instance from the second processor. The third processor may be effective to store the instance in a memory. The data center may include a fourth processor# COMPILATION OF CODE IN A DATA CENTER

CROSS REFERENCE TO RELATED APPLICATION(S)

This application is a national stage filing under 35 U.S.C §371 of International Application No. PCT/US12/28420 filed Mar. 9, 2012, the entirety of which is hereby incorporated by reference.

BACKGROUND

Unless otherwise indicated herein, the materials described in this section are not prior art to the claims in this application and are not admitted to be prior art by inclusion in this section.

A data center may include one or more sets of physical hardware stacks. A user may download and/or obtain a machine instance relating to the hardware stacks in the data center and generate a code or series of instructions based on the instance. The user may compile the code based on the machine instance and send compiled instructions to the data center for processing.

SUMMARY

In an example, a method for executing a code is generally described. The method may include receiving, by a first processor, a first code from a second processor. The method may include compiling, by the first processor, the first code for a first hardware stack to produce a first executable code. The method may further include compiling, by the first processor, the first code for a second hardware stack different from the first hardware stack to produce a second executable code. The method may include generating, by the first processor, a reference to the first executable code and the second executable code. The method may include storing the reference. The method may further include receiving, by a third processor, an instance from the second processor. The method may include storing, by the third processor, the instance in a memory. The method may further include receiving, by a fourth processor, a request to execute the instance. The method may include assigning, by the fourth processor, the instance to the first hardware stack. The method may include processing the reference to identify the first executable code. The method may further include receiving the first executable code by the first hardware stack. The method may include executing the first executable code on the first hardware stack.

In an example, a data center effective to execute a code is generally described. The data center may include a first hardware stack and a second hardware stack different from the first hardware stack. The data center may include a first processor configured to communicate with the first and second hardware stack. The first processor may be effective to receive a first code, from a second processor. The first processor may be effective to compile the first code for the first hardware stack to produce a first executable code. The first processor may be effective to compile the first code for the second hardware stack to produce a second executable code, and generate a reference to the first executable code and the second executable code. The first processor may be effective to cause the reference to be stored. The data center may include a third processor configured to communicate with the first and the second hardware stack. The third processor may be effective to receive an instance from the second processor. The third processor may be effective to store the instance in a memory. The data center may include a fourth processor configured to communicate with the first and second hardware stack. The fourth processor may be effective to receive a request to execute the instance. The fourth processor may be effective to assign the instance to the first hardware stack. The first hardware stack may be effective to receive the first executable code in response to the reference and execute the first executable code.

In an example, a system effective to compile a code is generally described. The system may include a first processor and a data center configured to communicate with the first processor over a network. The first processor may be effective to send a first code over the network to the data center. The data center may include a first hardware stack and a second hardware stack different from the first hardware stack. The data center may include a second processor configured to communicate with the first and the second hardware stack. The second processor may be effective to receive the first code, and compile the first code for the first hardware stack to produce a first executable code. The second processor may be effective to compile the first code for the second hardware stack to produce a second executable code. The second processor may be effective to generate a reference including an identification of the first executable code and the second executable code. The second processor may be effective to cause the reference to be stored. The first processor may further be effective to generate an instance and send the instance to the data center. The data center may further include a third processor configured to communicate with the first and the second hardware stack. The third processor may be effective to receive the instance and store the instance in a memory. The data center may include a fourth processor configured to communicate with the first and the second hardware stack. The fourth processor may be effective to receive a request to execute the instance and assign the instance to the first hardware stack. The first hardware stack may be effective to receive the first executable code in response to the reference and execute the first executable code.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
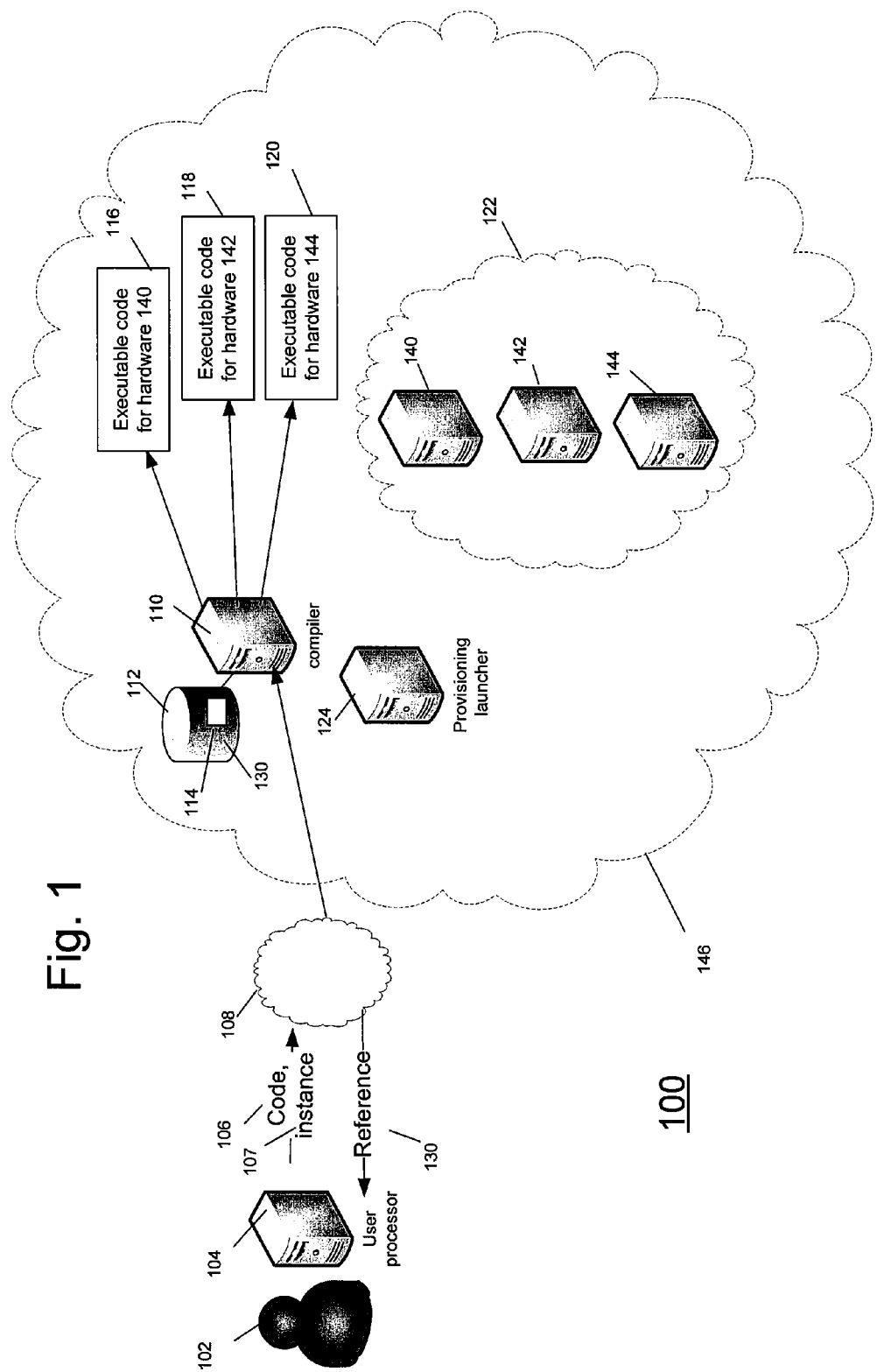
FIG. 1 illustrates some example systems that can be utilized to implement compilation of code in a data center.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to compilation of code in a data center.

Briefly stated, technologies are generally described for a system, method and data center effective to execute a code. In an example, a method may include receiving, by a first processor, a first code from a second processor. The method may further include compiling the first code for first and second hardware stacks to produce first and second executable codes. The second hardware stack may be different from the first hardware stack. The method may include generating a reference to the first executable code and the second executable code and storing the reference. The method may further include receiving, by a third processor, an instance and a request to execute the instance. The method may further include executing the first executable code by the first hardware stack.

FIG. 1 illustrates some example systems that can be utilized to implement compilation of code in a data center arranged according to at least some embodiments described herein. In some examples, as explained in more detail below, a system 100 may include a user processor 104, a compiler processor 110, data center hardware 122, and/or a provisioning launcher processor 124 arranged in communication such as through one or more networks 108, 146. Two or more processors may be disposed in a single housing and/or one processor may be distributed across multiple housings such as across a network. Processors may include one or more processing units, memory, controllers, an operating system, inputs, outputs, etc. As discussed in more detail below, a user 102 may generate code 106, such as source code, using processor 104. Processor 104 may send code 106 over network 108 to compiler 110.

In an example, processor 104 may send an instance 107 of a memory of processor 104, to compiler 110. The instance may include code 106. Processor 104 may further send configuration information directing compiler 110 to compile code 106. The configuration information may come from a command console in communication with processor 104 or the configuration information may be stored with instance 107. Instance 107 may be stored in memory 112.

Compiler 110 may receive code 106 and compile code 106 for one or more hardware stacks 140, 142, 144 of data center hardware 122 to produce one or more executable codes 116, 118, 120. A hardware stack assigned to user processor 104 to execute instructions related to code 106 may then select the applicable executable code for execution.

Compiler 110 may be a processor with a compiler component and may be adapted to receive code 106 and compile one or more versions of code 106 for at least some of hardware stacks 140, 142, 144. For example, compiler 110 may dispatch code 106 to hardware stacks 140, 142,144 to compile code 106 on the respective hardware stacks. Compiler 110 may be in communication with a memory 112 including instructions 114. Instructions 114 may be adapted to control an operation of compiler 110. Compiler 110 may further generate a reference 130 referencing executable codes 140, 142, 144. Reference 130 may be sent to and stored by processor 104. Compiler 110 may store reference 130 in memory 112 of data center/network 146. Compiler 110 may send reference 130 to processor 104 prior to, during, and/or after compiling code 106 to produce executable codes 116, 118, 120. For example, compiler 110 may compile code 106 for one hardware stack, send reference 130, and then compile code 106 for other hardware stacks. User processor 104 may be adapted to receive reference 130.

Compiler 110 may be adapted to generate executable code for as many variations of hardware stacks in data center hardware 122 as desired. For example, compiler 110 may avoid compiling code 106 for certain instances of hardware stacks. A first hardware stack may include a first set of hardware with a first virtual machine supervisor and a second hardware stack may include the first set of hardware with a second virtual machine supervisor. The second virtual machine supervisor may present a different virtualized experience of the hardware from the first virtual machine supervisor. In an example, compiler 110 may avoid compiling code 106 on a hardware stack that includes mobile phone processors where code 106 will not be run on a mobile phone processor.

Compiler 110 may be adapted to generate executable codes 116, 118, 120 based on hardware characteristics of hardware stacks such as based on physical memory, mother boards, processors, storage, disk access, etc. Compiler 110 may be adapted to generate multiple executable versions for the same hardware stack but with settings altered, such as settings relating to available resources, hypervisor type, co-located processes, power conservation modes, or other environmental states, to determine what setting may work best for a specific user application.

Reference 130 may be an executable file that, when executed by a hardware stack, may point to an applicable executable code. For example, reference 130 may include an HTTP get or post command. Reference 130 may include copies of one or more executable codes 116, 118, 120.

Figure 2:
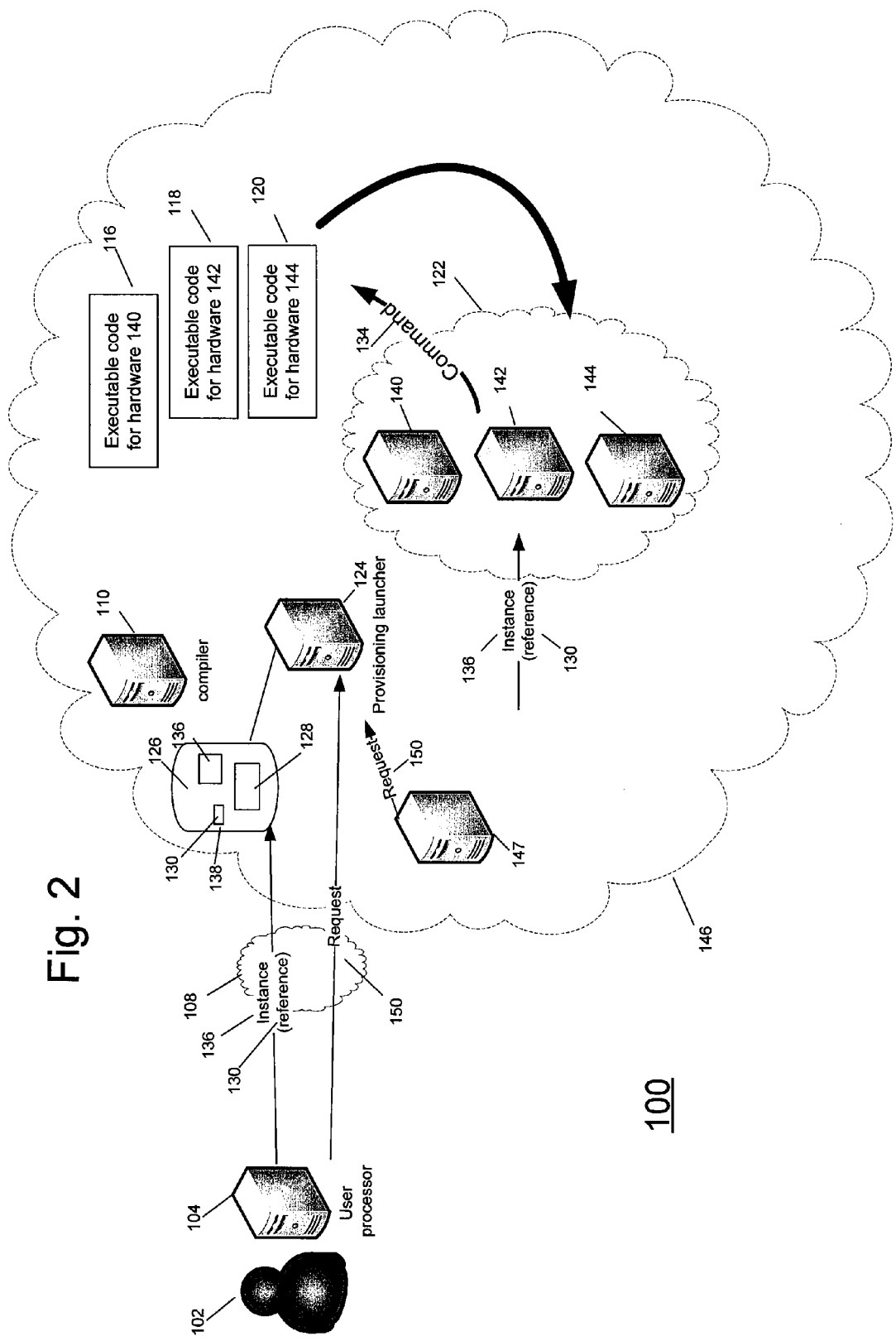
FIG. 2 illustrates some example systems that can be utilized to implement compilation of code in a data center.

FIG. 2 is illustrates some example systems that can be utilized to implement compilation of code in a data center arranged according to at least some embodiments described herein. Those components in FIG. 2 that are labeled identically to components of FIG. 1 will not be described again for the purposes of clarity.

User processor 104 may send an instance 136, such as a machine image, to network 146 for processing on hardware 122. Instance 136 may include reference 130. Management information relating to instance 136 may include reference 130. In other examples, reference 130 may be stored in memory 112 of network 146 so that user processor 104 need not handle reference 130. A processor 147 in network 146 may be configured to receive and store instance 136 in a memory, such as memory 126. Thereafter, user processor 104 may generate a request 150 to execute instance 136. In another example, management software, such as may be executed by processor 147, may be configured to generate request 150 to execute instance 136. Request 150 may be received by provisioning launcher 124. Provisioning launcher 124 may be a processor with a provisioning launcher component. Provisioning launcher 124 may be in communication with memory 126 including instructions 128 adapted to control a functioning of provisioning launcher 124. In response to request 150, provisioning launcher 124 may be effective to select a hardware stack in hardware 122 to execute instance 136. Provisioning launcher 124 may select a particular hardware stack for execution of instance 136 based on a user's profile, hardware machines that are available, to maximize power usage, based on demand on the available processors, whether the user indicated that multiple processors may be used, etc.

As mentioned above, instance 136 may include reference 130. In some examples, reference 130 may include executable code that may generate a get or post HTTP command 134 when reference 130 is executed in hardware 122. In some examples, reference 130 may include a non-executable link identifying one or more executable codes 116, 118, 120. For example, provisioning launcher 124 may parse instance 136, and identify reference 130. Provisioning launcher may also identify reference 130 in the management information relating to instance 136. Provisioning launcher 124 may then compare reference 130 with lookup table 138 in memory 126 to identify executable codes 116, 118, 120 that may be used by the particular hardware stack.

The assigned particular hardware stack assigned by provisioning launcher 124 may receive instance 136 and may then execute reference 130 to generate command 134. Command 134 may be generated on the particular hardware stack in response to reference 130. Command 134 may include links identifying one or more executable codes 116, 118, 120 including a particular executable code compiled for the particular hardware stack executing instance 136. Command 134 may include a reference to a lookup table 138 in memory 126. Lookup table 138, in turn, may include references to one or more executable codes 116, 118, 120. The particular hardware stack may receive and execute the particular executable code based on instance 136, reference 130 and the particular hardware stack.

In an example, if provisioning launcher 124 assigns hardware stack 140 to execute instance 136, hardware stack 140 may execute reference 130 to generate command 134 and assign executable code 116 corresponding to hardware stack 140. As discussed above, as executable code 116 may be compiled specifically for the particular hardware stack, executable code 116 may be optimized in one or more ways for the particular hardware stack 140.

In an example, a user may desire to execute particular code on a data center including hardware stacks. A compiler may receive the particular code and generate multiple executable versions of the code, each version for a different hardware stack. The compiler may further send a reference to the user that may include an executable code effective to generate a command that identifies the executable versions of the particular code. The user may then send an instance to be processed including the reference to the data center. Thereafter, when the user wants to execute the particular code, the user may send a request to execute the particular code to the data center. A provisioning launcher at the data center may assign a hardware stack to the user in response to the request. The hardware stack may process the reference, generate the command, and receive the executable version of the particular code.

In an example, system 100 may be used to implement a virtual provisioning environment where one or more users may access one installation of a code from different machines. The code may be compiled by a compiler to produce executable codes effective to be run on the user's respective machines. A request by a user to execute the code may identify the user's hardware such as directly or by address information in the request. Different executable codes may be provided to different users depending on their respective hardware.

Among other possible benefits, code may be compiled such that the compiled code is optimized for the particular hardware stack that runs the code. Data centers need not identify their specific hardware being implemented. A dynamic compiler that compiles a code as the code is being executed need not be used. Code need not be drafted for different possible operating environments. Data centers need not be maintained with substantially homogenous hardware stacks which could be difficult to maintain as hardware may be changed and/or upgraded periodically. Data centers may test different compilations and determine which compilation settings work better than other settings.

Figure 3:
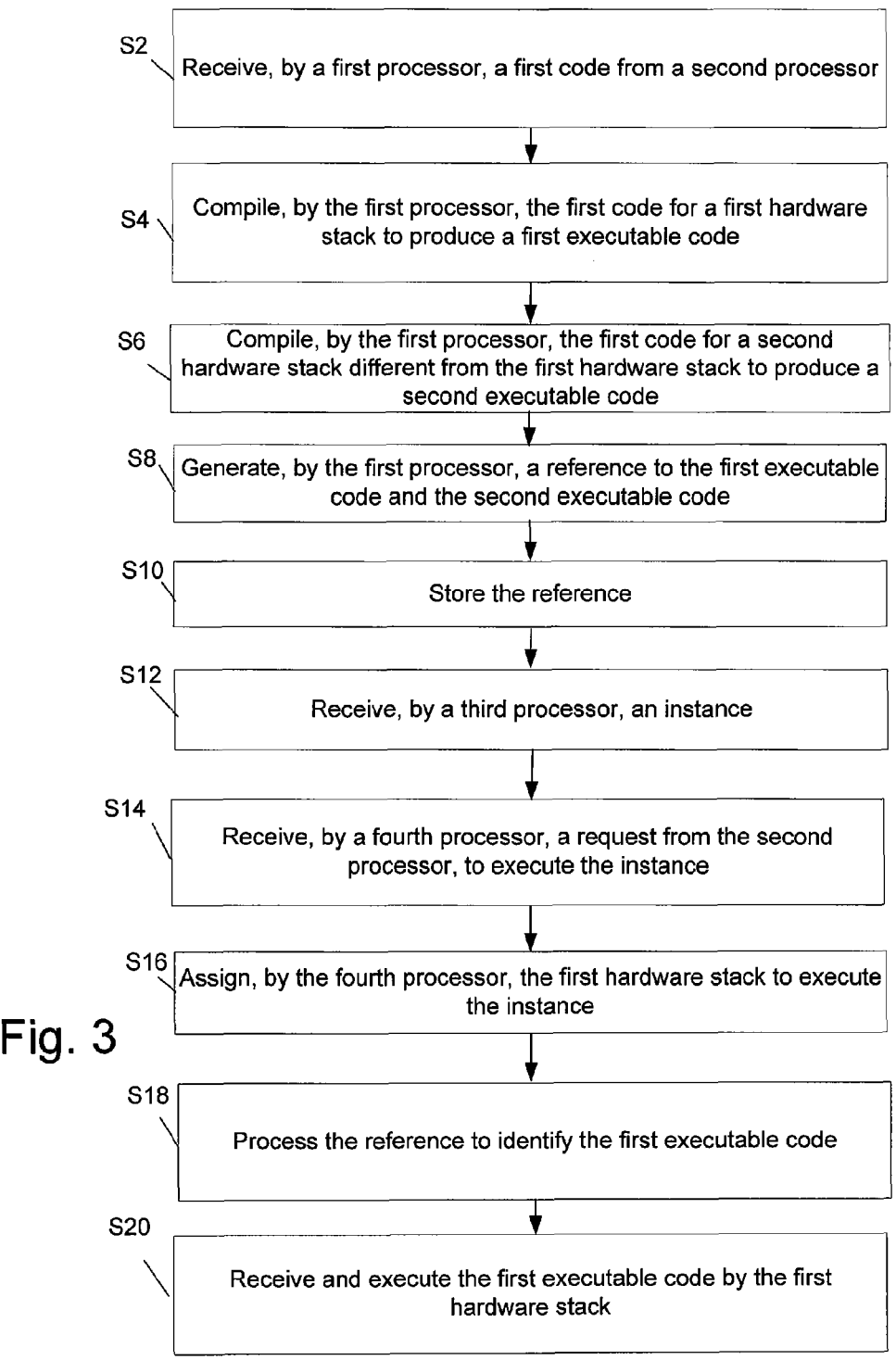
FIG. 3 depicts a flow diagram for example processes for implementing compilation of code in a data center.

FIG. 3 depicts a flow diagram for example processes for implementing compilation of code in a data center arranged in accordance with at least some embodiments described herein. The process in FIG. 3 could be implemented using, for example, system 100 discussed above. An example process may include one or more operations, actions, or functions as illustrated by one or more of blocks S2, S4, S6, S8, S10, S12, S14, S16, S18 and/or S20. Although illustrated as discrete blocks, various blocks may be divided into additional blocks, combined into fewer blocks, or eliminated, depending on the desired implementation. Processing may begin at block S2.

At block S2, a first processor may be configured to receive a first code from a second processor. The first processor may include, for example, a compiler component in a data center. The second processor may be in communication with a user who wants to have code compiled and executed by the data center. Processing may continue from block S2 to block S4.

At block S4, the first processor may compile the first code for a first hardware stack to produce a first executable code. Processing may continue from block S4 to block S6.

At block S6, the first processor may compile the first code for a second hardware stack different from the first hardware stack to produce a second executable code. Processing may continue from block S6 to block S8.

At block S8, the first processor may generate a reference to the first execute code and the second executable code. The reference may for example generate an HTTP post or get command. Processing may continue from block S10.

At block S10, the first processor may cause the reference to be stored. For example, the first processor may send the reference to the second processor. In another example, the first processor may store the reference in the data center. Processing may continue from block S10 block S12.

At block S12, a third processor may receive an instance from the second processor. Processing may continue from block S12 to block S14.

At block S14, a fourth processor may receive a request to execute the instance. Processing may continue from block S14 to block S16.

At block S16, the fourth processor may assign the first hardware stack to execute the instance. Processing may continue from block S16 to block S18. At block S18, the reference may be processed to identify the first executable code. For example, the first hardware stack may execute the reference to generate a command identifying the first executable code. Processing may continue from block S18 to block S20. At block S20, the first hardware stack may receive and execute the first executable code.

Figure 4:
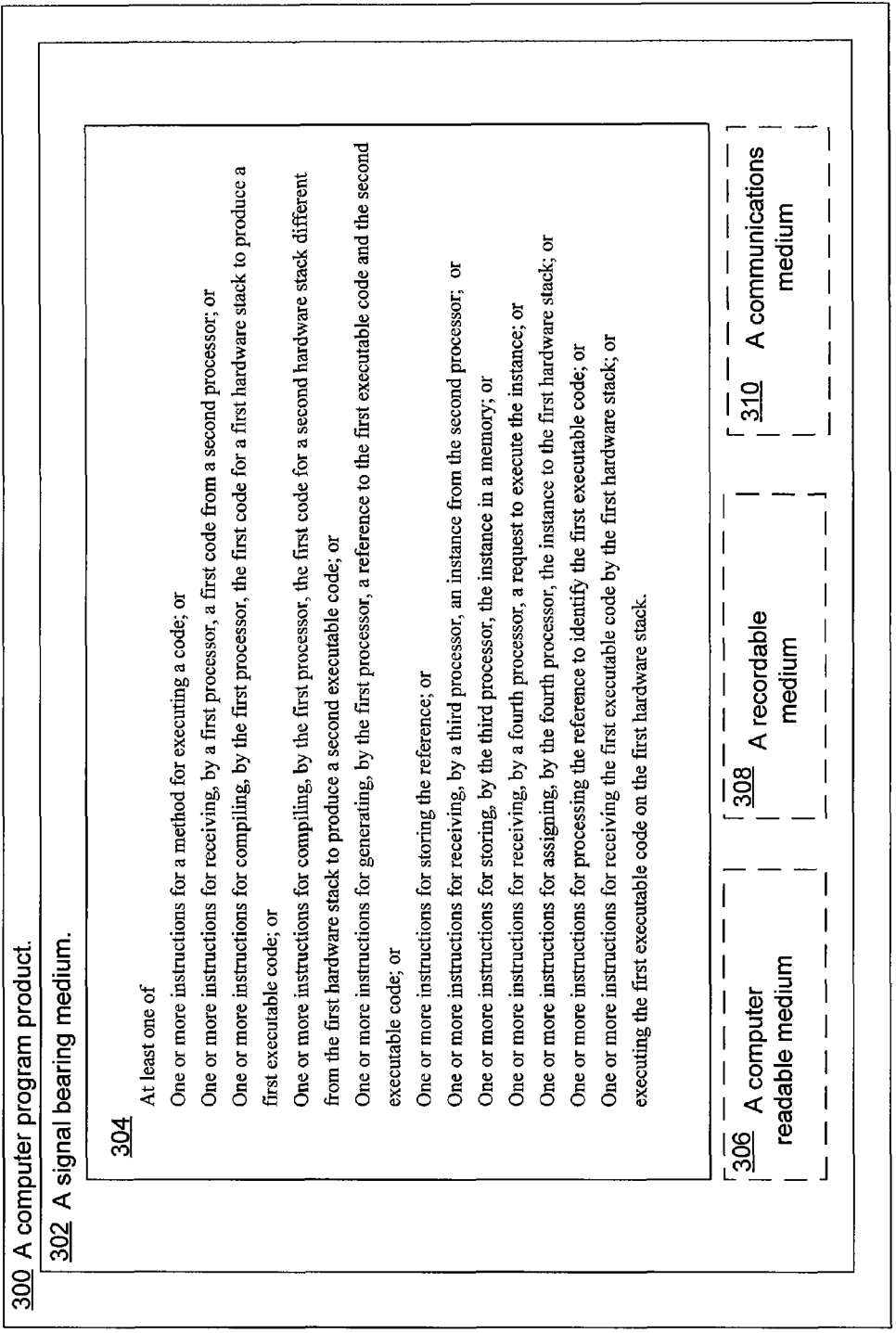
FIG. 4 illustrates computer program products for implementing compilation of code in a data center.

FIG. 4 illustrates computer program products 300 for implementing compilation of code in a data center arranged in accordance with at least some embodiments described herein. Program product 300 may include a signal bearing medium 302. Signal bearing medium 302 may include one or more instructions 304 that, when executed by, for example, a processor, may provide the functionality described above with respect to FIGS. 1-3. Thus, for example, referring to system 100, one or more of processors 122 or 124 may undertake one or more of the blocks shown in FIG. 4 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

Figure 5:
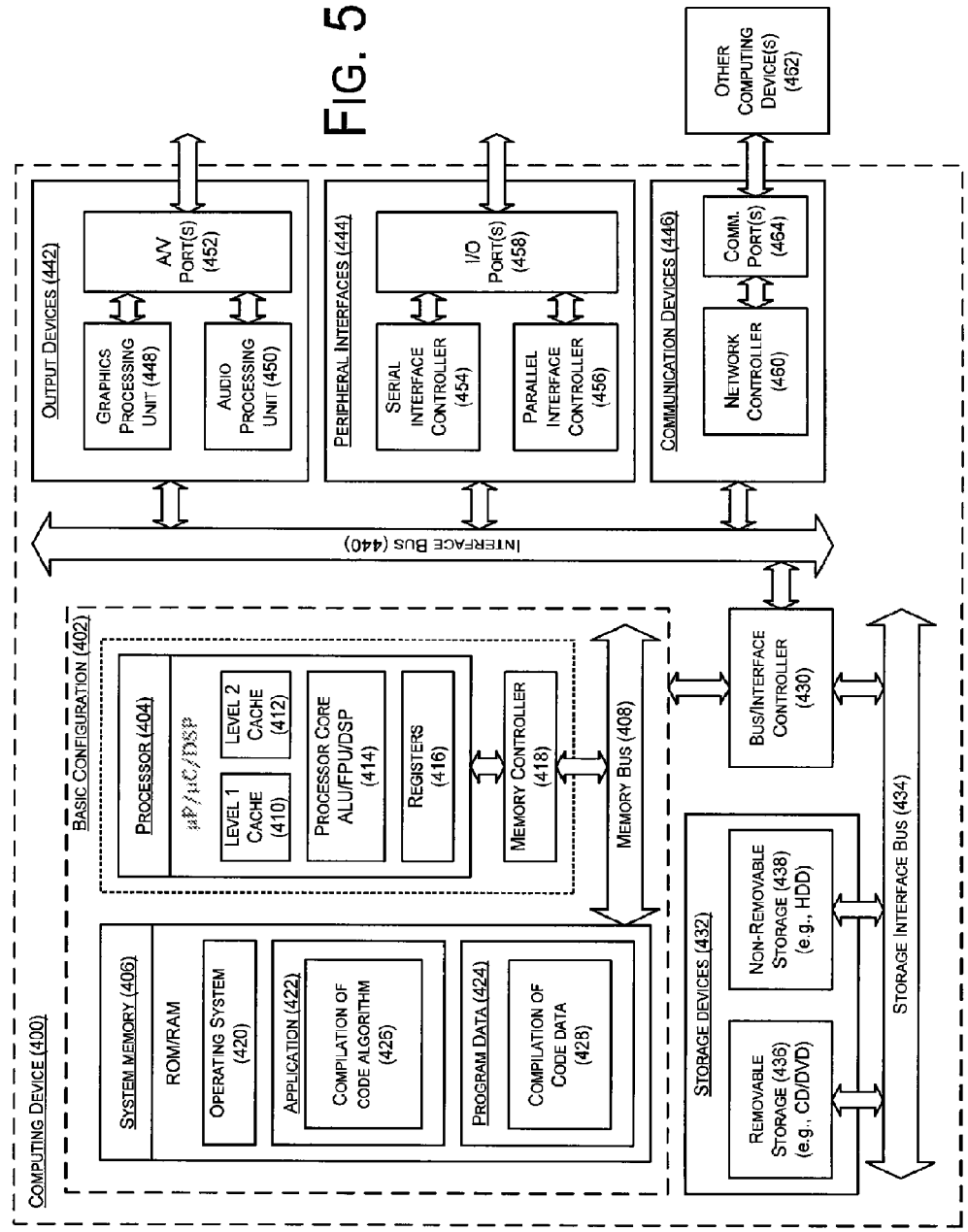
FIG. 5 is a block diagram illustrating an example computing device that is arranged to implement compilation of code in a data center; all arranged according to at least some embodiments described herein.

FIG. 5 is a block diagram illustrating an example computing device 400 that is arranged to implement compilation of code in a data center arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include a compilation of code algorithm 426 that is arranged to perform the functions as described herein including those described previously with respect to FIGS. 1-4. Program data 424 may include compilation of code data 428 that may be useful for implementing a compilation of code algorithm as is described herein. In some embodiments, application 422 may be arranged to operate with program data 424 on operating system 420 such that compilation of code in a data center may be provided. This described basic configuration 402 is illustrated in FIG. 5 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to execute a code by a data center, the method comprising:
   receiving, by a first processor, a first code from a second processor;
   compiling, by the first processor, the first code for hardware of a first hardware stack of the data center, to produce a first instance of executable code and at least a second instance of executable code comprising different settings compared to the first instance of executable code, wherein the first instance and second instance of executable codes are compiled for the first hardware stack;
   compiling, by the first processor, the first code for hardware of a second hardware stack of the data center, different from the first hardware stack to produce a third instance of executable code compiled for the second hardware stack;
   generating, by the first processor, a reference to the first, second and third instances of executable codes for the first code;
   storing the reference in a first memory;
   storing the first, second and third instances in the first memory or in a second memory of the data center;
   receiving, by a third processor, a request from the second processor to execute the first code;
   assigning, by the third processor, the request and the reference to the first hardware stack of the data center;
   processing the reference, by the first hardware stack, to generate a command to identify the first instance of executable code compiled for the first hardware stack from among the first, second, and third instances of executable code from the first memory or the second memory;

retrieving, by the first hardware stack, the first instance of executable code from the first memory or the second memory; and executing the first instance of executable code on the first hardware stack of the data center.

2. The method of claim 1, wherein processing the reference, by the first hardware stack, to generate the command to identify the first instance of executable code further includes analyzing, by the first hardware stack, a table using the reference to identify the first, second, and third instances of executable code.

3. The method of claim 1, wherein the method further includes analyzing, by the third processor, a table using the reference to identify at least one of the first, second, and third instances of executable code.

4. The method of claim 1, further comprising:
receiving by the third processor the first code with a machine image;
sending, by the third processor, the first code to the first processor; and
storing, by the first processor, the reference in the second memory.

5. The method of claim 1, further comprising:
compiling, by the first processor, the first code for a third hardware stack, wherein the third hardware stack is selected by the first processor based on a determination by the first processor that the first code will execute using hardware in the third hardware stack.

6. The method of claim 1, wherein the different settings are related to available resources, hypervisor type, co-located processes, power conservation modes, or environmental states.

7. The method of claim 1, wherein the request to execute is sent by the second processor in one of a web interface, script software or management software.

8. The method of claim 1, wherein the request to execute is directed to an internet protocol address of the third processor.

9. The method of claim 1, wherein storing the reference in the first memory includes sending the reference from the first processor to the second processor, wherein the first memory is associated with the second processor.

10. The method of claim 1, wherein: storing the reference in the first memory includes sending the reference from the first processor to the second processor, and storing the reference by the second processor in the first memory associated with the second processor; and
the method further comprises receiving by the third processor from the second processor, the first code and a machine image.

11. The method of claim 1, further comprising receiving, by the first processor, the first code and a machine image.

12. A data center effective to execute a code, the data center comprising:
a first hardware stack of the data center;
a second hardware stack of the data center different from the first hardware stack;
a first processor configured to communicate with the first and second hardware stack, the first processor effective to:
receive a first code, from a second processor,
compile the first code for hardware of the first hardware stack of the data center, to produce a first instance of executable code and at least a second instance of executable code comprising different settings compared to the first instance of executable code, wherein the first instance and second instance of executable codes are compiled for the first hardware stack,
compile the first code for hardware of the second hardware stack of the data center, to produce a third instance of executable code compiled for the second hardware stack,
generate a reference to the first, second and third instances of executable codes for the first code;
cause the reference to be stored in a first memory; and
cause the first, second and third instances to be stored in the first memory or in a second memory of the data center;
a third processor configured to communicate with the first and the second hardware stack, the third processor effective to:
receive a request from the second processor to execute the first code;
assign the request and the reference to the first hardware stack of the data center;
the first hardware stack of the data center effective to process the reference to generate a command to identify the first instance of executable code compiled for the first hardware stack from among the first, second, and third instances of executable code from the first memory or the second memory to retrieve the first instance of executable code; and
execute the first instance of executable code.

13. The data center of claim 12, wherein the reference includes a http post or get command.

14. A system effective to execute a code in a data center, the system comprising:
a first processor; and
a data center configured to communicate with the first processor over a network;
the first processor effective to send a first code over the network to the data center;
the data center including:
a first hardware stack;
a second hardware stack different from the first hardware stack;
a second processor configured to communicate with the first and the second hardware stack, the second processor effective to:
receive the first code,
compile the first code for hardware of the first hardware stack to produce a first instance of executable code and at least a second instance of executable code compiled for different hardware settings compared to the first instance of executable code, wherein the first instance and second instance of executable codes are compiled for the first hardware stack;
compile the first code for hardware of the second hardware stack to produce a third instance of executable code compiled for the second hardware stack;
generate a reference including an identification of the first, second and third instances of executable codes for the first code;
cause the reference to be stored in a first memory; and
cause the first, second and third instances to be stored in the first memory or in a second memory of the data center;
the data center further including:
a third processor configured to communicate with the first and the second hardware stack, the third processor effective to:

receive a request from the first processor to execute the first code;
assign the request and the reference to the first hardware stack of the data center;
the first hardware stack effective to:
process the reference to generate a command to identify the first instance of executable code compiled for the first hardware stack from among the first, second, and third instances of executable code from the first memory or the second memory; and
retrieve the first instance of executable code.

15. The system of claim 14, wherein the third processor is further effective to analyze a table using the reference to identify at least one of the first, second and third instances of executable code.

16. The system of claim 14, wherein:
the third processor is effective to receive the first code with a machine image;
the third processor is effective to send the first code to the first processor; and
the first processor is effective to store the reference in the first or second memory.

17. The system of claim 14, wherein the reference includes a http post or get command.

18. The system of claim 14, wherein the second processor is further effective to compile the first code for a third hardware stack, wherein the third hardware stack is selected by the second processor based on a determination by the first processor that the first code will execute using hardware in the third hardware stack.

19. The system of claim 14, wherein the different hardware settings are related to available resources, hypervisor type, co-located processes, power conservation modes, or environmental states.

* * * * *